FULL ADDER

Filed May 14, 1957

2 Sheets-Sheet 1

INVENTOR
JOHN L. ANDERSON

BY ATTORNEY

| | | 1 | 2 | 3 | 4 | 5 | 6 | 7 | 8 |
|---|---|---|---|---|---|---|---|---|---|
| INPUTS | 10 (X) | 0 | 1 | 0 | 0 | 1 | 0 | 1 | 1 |
| | 11 (Y) | 0 | 0 | 1 | 0 | 1 | 1 | 0 | 1 |
| | 12 (C) | 0 | 0 | 0 | 1 | 0 | 1 | 1 | 1 |
| OUTPUTS | SUM 14 | 0 | 1 | 1 | 1 | 0 | 0 | 0 | 1 |
| | CARRY 15 | 0 | 0 | 0 | 0 | 1 | 1 | 1 | 1 |
| STATUS OF INVERTERS | 16 | ON | OFF | ON | ON | OFF | ON | OFF | OFF |
| | 20 | ON | OFF | OFF | ON | OFF | OFF | OFF | OFF |
| | 21 | OFF | OFF | OFF | OFF | ON | OFF | OFF | ON |
| | 22 | OFF | OFF | OFF | OFF | ON | OFF | OFF | ON |
| | 24 | OFF | OFF | OFF | ON | OFF | OFF | OFF | ON |
| | 25 | OFF | ON | ON | OFF | OFF | OFF | OFF | OFF |
| | 26 | OFF | OFF | OFF | OFF | OFF | ON | ON | OFF |
| | 27 | ON | ON | ON | OFF | ON | OFF | OFF | OFF |

INVENTOR
JOHN L. ANDERSON
BY Paul M. Enlow
ATTORNEY

3,022,951
FULL ADDER

John L. Anderson, Poughkeepsie, N.Y., assignor to International Business Machines Corporation, New York, N.Y., a corporation of New York Filed May 14, 1957, Ser. No. 659,081
8 Claims. (Cl. 235—176)

This invention relates in general to binary adders and more particularly to binary full adders employing electrical devices for performing logical functions.

A binary full adding circuit is one responsive to a plurality of input digit signals to provide sum and carry output signals in accordance with the rules of binary addition. A binary full adder provides a signal at the sum output terminal when binary digit signals are applied to one or three of the inputs to the adder. The adder provides a carry output signal when two or more of the inputs receive signals representing binary digits.

In the electronic computing art, binary digits are frequently represented as electrical signals or pulses having first and second amplitude levels which may be characterized as "Up" and "Down" respectively. The prior art includes circuits for effecting binary addition by logical operations performed in accordance with mathematical expressions defining the rules of binary addition. Logical operations are performed in an electronic computer by devices responsive to electrical signals for generating signals indicative of the input signals applied to the device. Examples of devices for performing logical operations are the well-known "And," "Or," "Inverting," etc. circuits.

Devices known in the prior art for performing logical functions include transistors having input signals applied to the emitter and base electrodes to develop an output signal at the collector thereof. In such a circuit, means are provided for normally biasing the base positive with respect to the emitter thereof so that the transistor is Off and the collector potential is Down; i.e., the transistor is conducting little or no collector current. The coincidence of an Up signal at the emitter and a Down signal at the base, turns the transistor On to provide substantial collector current flow thereby establishing an Up signal at the collector. By utilizing the device described as a logical circuit element wherein the coincidence of Up and Down signals at particular electrodes of the transistor produces an output signal, a simplified adding circuit may be constructed utilizing fewer electrically conductive devices than possible heretofore.

It is therefore a general object of the invention to provide a novel binary adder employing electrically conductive devices as logical circuit elements.

It is also an object of the invention to provide a novel binary adder employing transistors as logical circuit elements.

Another object of the invention is to provide a novel binary full adder employing coincidence type inverting logical elements for producing signals representing a summation of representations of binary digits.

It is also an object of the invention to provide a novel adding circuit employing transistors for effecting a summation of a plurality of representations of binary digits and producing representations of a sum and a carry.

Another object is to provide a novel binary adding circuit employing transistors as inverting circuits wherein a coincidence of a negative direction signal at the base electrode and a positive direction signal at the emitter electrode of each transistor is necessary in order to produce conduction therein.

A still further object of the invention is to provide a novel binary adder employing a plurality of identical component circuits each effecting the same logical function wherein each said circuit employs a transistor functioning as an inverter.

In accordance with the invention, there is provided a novel binary adder having first, second and third inputs and sum and carry outputs, means coupled to said first and second inputs for producing a representation of substantially identical input signals thereat, means responsive to said representation and said third input for producing a summation signal at said sum output, and means responsive to said representation and said third input for producing a carry signal at said carry output.

Another feature of the invention is the provision of an improved logical adder which is easily constructed, requires a minimum number of logical circuit components and is economical to manufacture and operate.

Other objects of the invention will be pointed out in the following description and claims and illustrated in the accompanying drawings, which disclose, by way of example, the principle of the invention and the best mode, which has been contemplated, of applying that principle.

Figures 1, 2A, 2B:
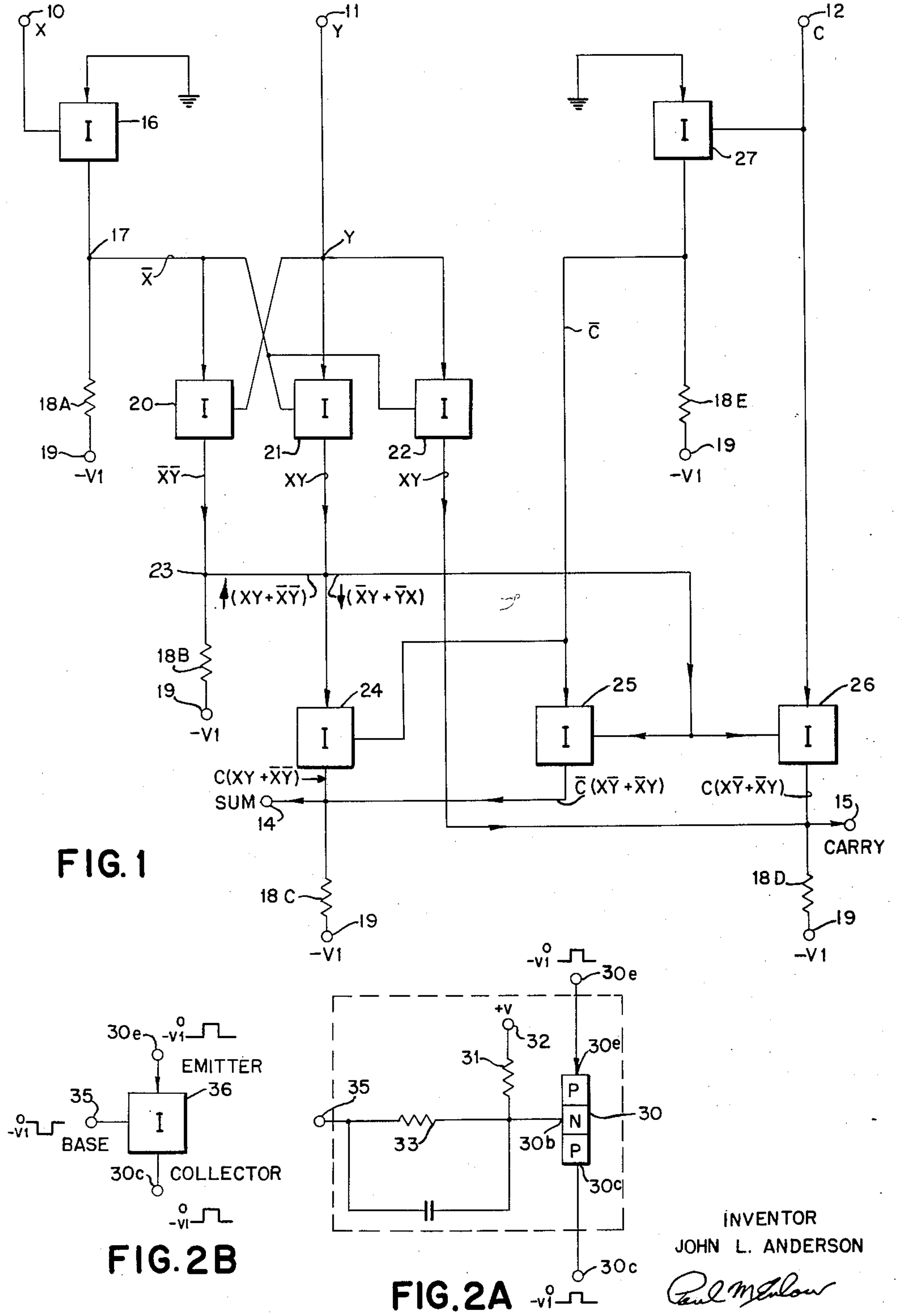
FIG. 1 illustrates a first embodiment of the novel binary adder.
FIG. 2A is a schematic diagram of the active logical component employed in FIG. 1.
FIG. 2B is a block diagram of the circuit illustrated in FIG. 2A.

Referring more particularly to FIG. 1, a first embodiment of a binary full adder embodying the invention is illustrated. The binary adder comprises input terminals 10, 11 and 12 and includes a sum output terminal 14 and a carry output terminal 15. Electrical representations of two binary bits which are to be added are generally applied to input terminals 10 and 11 and a carry signal from a lower binary order is applied to input terminal 12. The binary adder of FIG. 1 functions in accordance with the well-known rules of binary addition so that if two or more input signals representing binary 1 bits are applied to terminals 10–12 of the adder, an output signal appears at the carry output terminal 15. A sum output signal appears at terminal 14 when information signals indicative of one or three binary 1 bits are applied to input terminals 10–12. In the embodiment of FIG. 1, the presence of a binary 1 bit is indicated by a positive pulse which is applied to one of the input terminals 10–12. Similarly, a positive pulse appearing at output terminal 14 or 15 is indicative of a binary 1 bit.

The binary full adder of FIG. 1 comprises a plurality of stages 16, 20–22, and 24–27, each of which serves as an inverting circuit and some of which serve as coincidence type inverting circuits. Although any well-known inverting stage affording the functions described hereinbelow may be utilized in the circuit of FIG. 1 without departing from the scope of the invention, each stage may be of the type illustrated in FIG. 2A which is disclosed and claimed in copending application of George D. Bruce et al., Serial No. 459,322, now Patent No. 2,891,172, filed September 30, 1954, or of the type disclosed and claimed in the copending application of Joseph C. Logue et al., Serial No. 583,584, now abandoned, filed May 8, 1956.

Referring more particularly to FIG. 2A, the inverting stage comprises a PNP junction transistor 30 which is provided with the base electrode 30*b*, emitter electrode 30*e* and collector electrode 30*c*. Base electrode 30*b* is connected through resistor 31 to a positive potential source 32. The positive potential +V of source 32 in conjunction with resistor 31 serve to bias base electrode 30*b* positive with respect to the emitter thereof. Base electrode 30b is also connected through the parallel combination of resistor 33 and capacitor 34 to terminal 35. The emitter and collector electrodes of transistor 30 are respectively connected to terminals labelled 30e and 30c.

In order to facilitate the explanation of the invention, the inverting circuit of FIG. 2A is represented by the block diagram of FIG. 2B. A lead entering the top of block 36 corresponds to terminal 30e and thus is connected to the emitter electrode of the transistor. The arrow on this lead adjacent the rectangle is indicative of the connection to the emitter. In FIG. 2B, the lead connected to the bottom of block 36 corresponds to terminal 30c of FIG. 2A and thus represents the connection to the collector of the transistor. A lead entering either the right-hand or left-hand side of block 36 of FIG. 2B, corresponds to the connection of terminal 35 through a coupling network to the base of the transistor.

Consider that input pulses applied to the circuit of FIG. 2A are limited to excursions between ground potential (0 volts) and a negative potential —V1. Assume, for example, that emitter electrode 30e of FIG. 2A is connected to ground and that the collector electrode 30c is connected through a suitable load resistance to a potential of —V1. If a voltage signal of ground potential is applied to input terminal 35, the voltage dividing network comprising resistors 33 and 31 cause base electrode 30b of transistor 30 to be slightly positive with respect to ground potential. Since the base is positive with respect to the emitter of transistor 30, the transistor is OFF and substantially no collector current flows. Accordingly, collector electrode 30c will be at a negative potential substantially equal to —V1. If the input signal is now decreased to a potential of —V1, the base of transistor 30 will be negative with respect to the emitter thereof and thus the transistor is turned On. Conduction by transistor 30 of collector current causes the potential of the collector to rise to approximately ground potential due to the voltage drop across the collector load impedance. It is apparent that under the conditions described the circuit of FIG. 2A produces an inversion of the potential level of the signal applied to terminal 35.

The inverting circuit of FIG. 2A, may also be utilized as a coincidence type inverting circuit by applying a first input signal to terminal 30e and a second input signal to terminal 35. In this situation, the collector electrode 30c is connected through a suitable load impedance to a negative potential source —V1, and terminals 30e and 35 are connected to appropriate voltage signal sources. As a first example, consider that the input signal applied to terminal 30e is at approximately ground potential. Under these conditions, the circuit of FIG. 2A functions exactly as described above. That is, when the base input 35 is at 0 volts, output terminal 30c is at a potential of approximately —V1, whereas if terminal 35 is at a potential of —V1, output terminal 30c is at approximately ground potential. As a second example, consider that input terminal 30e is at a potential of —V1. Under these circumstances, output terminal 30c will remain at approximately —V1 regardless whether terminal 35 is at 0 volts or —V1. The latter statement is explained by the fact that when terminal 35 is at ground potential (terminal 30e at —V1), the base of transistor 30b is positive with respect to the emitter and thus is Off. Similarly, when terminal 35 is a —V1 (emitter 30e at —V1), the voltage division network comprising resistors 33 and 31 causes base electrode 30b to be positive with respect to terminal 35. Hence, the base of transistor 30 is positive with respect to the emitter thereof and the transistor is Off.

It is now apparent that when the circuit of FIG. 2A is utilized as a coincidence type inverting circuit, a particular coincidence of input pulses must be present in order to produce a positive direction output pulse. The requirements are that in order for a positive direction output pulse to be produced at terminal 30c, the potential of the pulse applied to input terminal 30e must be approximately ground potential and the potential of the signal applied to input terminal 35 must be approximately —V1 (i.e., negative with respect to the potential applied to terminal 30e).

To facilitate the description of the invention, the potential of a voltage signal or pulse is said to be Up when it is at its most positive excursion, and is said to be Down when the potential of the pulse is at its most negative excursion. In relation to the description hereinabove, terminal 35, for example, is said to be Up when it is at approximately ground potential and is said to be Down, when it is at a negative potential of approximately —V1.

Representations of binary digits or bits which are to be added together are applied to the input terminals 10–12 of FIG. 1. A binary 1 bit, for example, is represented by a positive direction pulse which causes the potential level of the terminal to which it is applied to go Up. Conversely, a binary 0 bit is represented by a negative direction pulse which causes a terminal to go Down. Similarly, when a binary 1 bit is represented at either of the output terminals 14 or 15, the respective terminal is Up. If either of the terminals 14 or 15 is Down, the potential level of the terminal is indicative of a binary 0.

Associated with various points in the circuit of FIG. 1 are Boolean algebra expressions which indicated the conditions necessary for the particular circuit point to be Up. For example, the characters X, Y, and C, respectively associated with terminals 10–12 indicate that these terminals are Up when representations of binary 1 bits are applied thereto. The characters $\overline{X}$, $\overline{Y}$ and $\overline{C}$ means that the point associated therewith is Up when input signals respectively representing X, Y, and C are Not present, i.e., are Down. The expression XY, for example, means that X and Y both must be Up for the circuit point in question to be Up. Conversely, the expression $\overline{XY}$ means that X and Y both must be Down for the point associated with the expression to be Up.

Returning to the binary full adder of FIG. 1, input terminal 10 is connected to the base input (corresponding to terminal 35 of FIG. 2A) of inverter 16. The emitter electrode of inverter 16 is connected to ground and the collector electrode thereof is connected via juncture 17 through resistor 18A to the negative potential source 19. Juncture 17 is also connected to the emitter electrode of inverter 20 and to the base input terminal of inverters 21 and 22.

Input terminal 11 is connected to the emitter electrodes of inverters 21 and 22 and is also connected to the base input of inverter 20.

The collector electrodes of inverters 20 and 21 are connected together at juncture 23 which is connected through resistor 18B to the negative potential source 19. The common connection of two or more collector electrodes is referred to as a "common collector Or circuit," since if either cllector is Up, the juncture of the collectors is Up. Thus, such a circuit effects the logical Or circuit function. Juncture 23 is also connected to the emitter input of inverter 24 and to the base inputs of inverters 25 and 26.

The collector electrode of inverter 24 is connected to the sum output terminal 14 and is also connected through resistor 18C to the negative potential source 19. Output terminal 14 is also connected to the collector electrode of inverter 25. The collector electrodes of inverters 24 and 25 are thus connected in a common collector Or circuit arrangement.

A carry input signal from a lower binary order is applied to input terminal 12. This terminal is connected to the base input of inverter 27. The emitter electrode of inverter 27 is connected to ground and the collector electrode thereof is connected to the base input of inverter 24, the emitter input of inverter 25, and is also connected through resistor 18E to the negative potential source 19. Input terminal 12 is also connected to the emitter electrode of inverter 26. The collector of inverter 26 is connected in a common collector Or circuit to the collector electrode of inverter 22 and to carry output terminal 15. Terminal 15 is further connected through resistor 18D to the negative potential source 19.

Figures 3, 4:
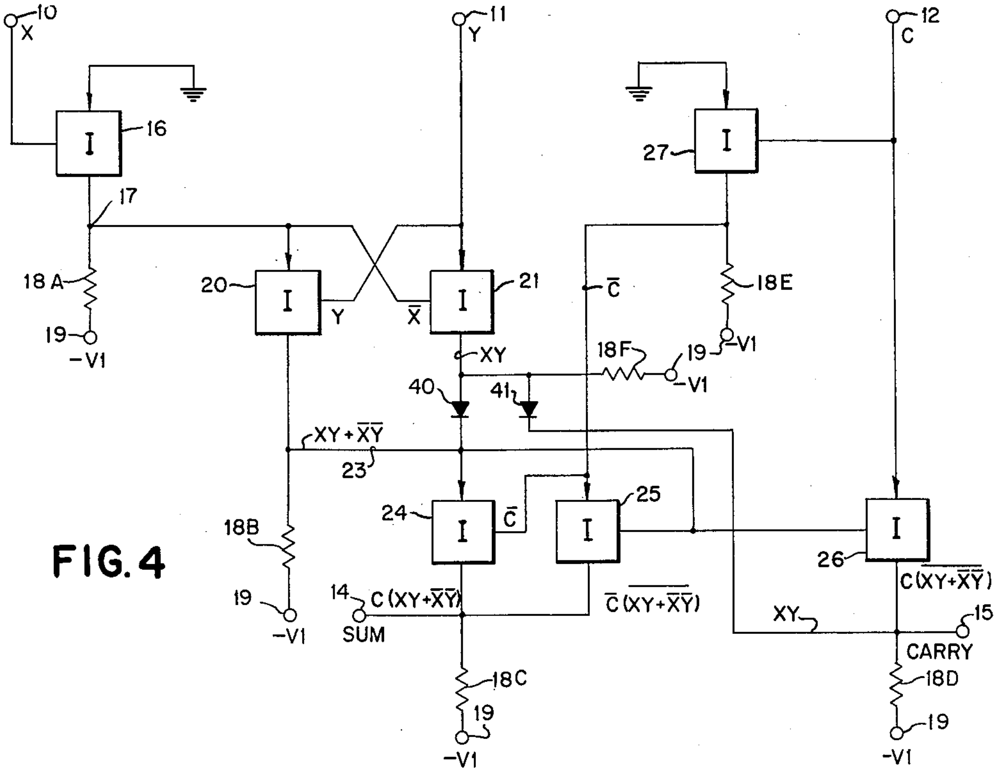
FIG. 3 is a tabulation of the operation of the circuits of FIG. 1.
FIG. 4 illustrates a second embodiment of the invention.

An analysis of all possible input conditions of terminals 10–12 which may arise is illustrated in FIG. 3. There are eight different sets of conditions which may exist, namely, 000, 100, 010, 001, 110, 011, 101, and 111, where the right-hand, middle and left-hand orders of these numbers respectively correspond to the conditions at terminals 10, 11 and 12. In FIG. 3 the term "On" opposite an inverter such as 16, for example, means that under the particular set of conditions, inverter 16 is conductive. The term "Off" implies that the inverter is non-conductive or cut off. Opposite the title "Inputs" in FIG. 3, a "0" represents a binary 0 and thus means that the particular input terminal is Down. A "1" represents a binary 1 and means that the particular input terminal is Up. Similarly, the notation 0 or 1 opposite the output terminals respectively indicate that the terminal is respectively Down or Up.

In describing the operation of the circuit of FIG. 1, it will be shown that sum output terminal 14 is Up when one or three of the input terminals are Up simultaneously, but is Down when a coincidence occurs between only two of the input terminals in the Up state. Similarly, it will be shown that carry output terminal 15 is Up only when two or three of the input terminals are Up simultaneously. Neither the sum output terminal 14 nor the carry output terminal 15 are Up when all of the input terminals are Down simultaneously.

When a representation of a binary 1 bit is applied to input terminal 10, for example, the base input of inverter 16 is Up causing the base electrode thereof to be positive with respect to the emitter so that the transistor is Off. Accordingly, the collector of inverter 16 and thus juncture 17 are Down. On the other hand, when a binary 0 is applied to input terminal 10 (terminal 10 Down), the base electrode of inverter 16 is negative with respect to the emitter and the transistor is On. The conduction by inverter 16 causes the collector electrode thereof and thus juncture 17 to be Up. Reference to FIG. 3 indicates that inverter 16 is conductive only when a binary 0 is applied to terminal 10.

Juncture 17 and thus the emitter electrode of inverter 20 is Up only when a binary 0 is applied to input terminal 10. Input terminal 11 is Down when a binary 0 is applied thereto. Accordingly, inverter 20 is On when the representation of a binary 0 is simultaneously applied to each of the input terminals 10 and 11. The output of inverter 20 is thus characterized as being Up when representation $\overline{X}$ and $\overline{Y}$ are respectively applied to the emitter and base inputs.

Inverter 21 is On only when the emitter input thereof is Up (terminal 11 is Up) and the base input thereof is Down (terminal 10 is Up and juncture 17 is Down). These conditions occur when representation of binary 1 bits are respectively applied to input terminals 10 and 11.

It is now clear that juncture 23 which is connected to the collector electrodes of inverters 20 and 21 is Up whenever representations of binary 1 bits are respectively applied to input terminals 10 and 11 simultaneously present or when representations of binary 0's are respectively applied thereto simultaneously. Juncture 23 is Down when one of the terminals 10 or 11 is Up and the other is Down.

Inverter 27 is On only when input terminal 12 is Down. Thus the output of inverter 27 is Up when a representation of a binary 0 is applied to terminal 12 (indicated by the character $\overline{C}$).

Inverter 24 is On when the emitter electrode is Up (XY or $\overline{XY}$) and the base input thereof is Down. The base of inverter 24 is Down when input terminal 12 is Up (binary 1). As stated above, inverter 20 is On to cause the emitter electrode of inverter 24 to be Up when both of the input terminals 10 and 11 are Down simultaneously. Inverter 21 is conductive to cause the emitter electrode of inverter 24 to be Up when both of the input terminals 10 and 11 are simultaneously Up. Stated another way, inverter 24 is On (sum output terminal 14 is Up) when each of the input terminals 10, 11 and 12 are Up simultaneously, or, when input terminal 12 is Up at the same time that terminals 10 and 11 are Down.

Since the emitter of inverter 25 is connected to the collector of inverter 27, the emitter is Up only when input terminal 12 is Down (binary 0). Inverter 25 can be On only when the base input thereof is Down which occurs only when one of the input terminals 10 or 11 is Up and the other is Down. Thus, inverter 25 is On to cause the sum output terminal 14 to be Up when: (*a*) terminal 12 is Down, and (*b*) only one of the terminals 10 or 11 is Up.

Reviewing briefly, the conditions under which the sum output terminal is Up to indicate a binary 1 bit are controlled by inverters 24 and 25. Inverter 24 is On when (*a*) all of the terminals 10, 11 and 12 are Up simultaneously, or (*b*) terminal 12 is Up and terminals 10 and 11 are both Down. Inverter 24 is Off when (*a*) terminal 12 is Down, and (*b*) only one of the terminals 10 or 11 is Up simultaneously.

The conditions which must exist in order for the carry output terminal 15 to be Up, are established by either inverter 22 or 26 of FIG. 1. It was noted hereinbefore that inverter 22 is On only when both of the input terminals 10 and 11 are Up simultaneously. In order for inverter 26 to be On, input terminal 12 must be Up. In addition, the base input of the inverter must be Down which occurs only when either terminal 10 or terminal 11, but not both of them, is Up. Thus, the carry output terminal is Up to represent a binary 1 bit when at least two of the input terminals are Up at the same time.

Where the binary full adder of FIG. 1 is incorporated into more complex computing circuits, it is sometimes possible to eliminate inverters 16 and 27. These inverters may be eliminated where the inversion of the signal normally applied to terminal 10 (i.e., the signal representing $\overline{X}$ is made available, and where the signal and the inversion thereof normally applied to terminal 12 are available. Accordingly, where signals indicative of the factors $\overline{X}$, C and $\overline{C}$ are available for application to the circuit of FIG. 1, a saving in components is effected by the elimination of inverters 16 and 27.

Referring more particularly to FIG. 4, a second embodiment of the novel binary full adder embodying the invention is illustrated. A comparison of FIG. 4 with FIG. 1 indicates that the circuits are nearly identical with the exception that the circuit of FIG. 4 eliminates the necessity for inverter 22 of FIG. 1. For sake of clarity, the components of FIG. 4 corresponding to similarly connected components of FIG. 1 bear identical reference characters.

Referring to FIG. 4, the collector electrode of inverter 21 is connected to the anodes of diodes 40 and 41 and is also connected through resistor 18F to the negative potential source 19. The cathode of diode 40 is connected to juncture 23 and the cathode of diode 41 is connected to the carry output terminal 15.

The diodes 40 and 41 serve to isolate juncture 23 from terminal 15 so that these points may be supplied by the same signal which is produced by inverter 21. When inverter 21 is On, the collector electrode goes Up which indicates that the potential thereof rises to approximately ground potential. Assuming that inverter 20 is Off, juncture 23 previously would have been Down or at approximately the potential of −V1. Accordingly, the potential difference across diode 40 is of the proper polarity for rendering the diode conductive. The collector current of inverter 21 flows through diode 40 and resistor 18B causing a potential drop to be developed across the resistor (juncture 23 goes Up). Thus the insertion of diode 40 of FIG. 4 does not alter the manner in which inverter 21 controls the potential of juncture 23 as described hereinbefore with respect to FIG. 1.

Diode 41 of FIG. 4 is non-conductive when inverter 21 is Off (collector electrode thereof is Down). When inverter 26 is Off, carry output terminal 15 is Down thereby applying a negative potential to the cathode of diode 41. When inverter 21 is turned On, the potential of the anode of diode 41 becomes positive with respect to the cathode thereof and conduction through the diode is instigated. The collector current from inverter 21 flows through diode 41 and resistor 18D to the negative potential source 19 thereby causing a voltage drop across the resistor. The voltage developed across the resistor 18D causes carry output terminal 15 to go Up.

The above description of FIG. 4 clearly indicates that the circuit thereof performs the same functions of binary addition as are performed by the circuit of FIG. 1. The following table illustrates, by way of example, values for the various impedances, potentials and capacitors which may be utilized in the circuit, and are in no way, to be considered as limiting the scope of the invention:

| | |
|---|---|
| Source −V1 | −5 volts. |
| Source +V | +10 volts. |
| Resistors 18A–18F | 1.6K. |
| Resistor 31 | 51K. |
| Resistor 33 | 9.1K. |
| Capacitor 34 | 150 mmf. |

Although the transistors utilized in the inverting stages of FIGS 1, 2A and 4 are illustrated as being PNP junction transistors, it will be readily understood that NPN transistors may be substituted for the PNP transistors providing that the polarities of the potential sources are reversed.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limted only as indicated by the scope of the following claims.

What is claimed is:

1. An adding circuit for producing sum and carry signals in response to first, second and third input digit signals comprising, first means having an output and responsive to said first and second input signals to produce a first representation at said output when said first and second input signals are of substantially identical value and to produce a second representation at said output when said first and second input signals are of different value, second means responsive to said representations at said output and to said third input signal for producing a sum signal when either of said representations and said third input signal are of substantially identical value, and third means coupled to the output of said first means and to said third input signal for producing a carry signal, whereby said sum and carry signals are indicative of the summation of said input signals.

2. An adding circuit for producing sum and carry signals in response to first, second and third input signals, each of said signals having a plurality of voltage levels comprising, means having an output and responsive to said first and second input signals for producing a first electrical representation when said first and second input signals exhibit substantially identical voltage levels and for producing a second electrical representation when said first and second input signals exhibit substantially different voltage levels, means responsive to said first electrical representation and a first level of said third input signal to produce a sum signal, means responsive to said second electrical representation and a second level of said third signal to produce a sum signal, means responsive to a coincidence of said first and second input signals at a first level to produce a carry signal, and means responsive to said second electrical representation and a first level of said third input signal to produce a carry signal, whereby a summation of said input signals is effected.

3. An adding circuit for producing sum and carry signals in response to first, second and third input signals, each shiftable between first and second signal states, comprising: first means having an output and responsive to said first and second input signals to produce a signal representation at said output in said first signal state when said first and second input signals are in the same signal state and to produce a signal representation at said second signal state when said first and second input signals are in dissimilar signal states; means responsive to said representation in said first signal state and to said third input signal in the first signal state to produce a sum signal; means responsive to said third input signal in said second signal state and to said representation in the second signal state to produce a sum signal; means responsive to said third input signal in said first state and said representation in said second state to produce a carry signal; and means responsive to said first means for producing a carry signal when said first and second input signals are in said first state.

4. An adding circuit for producing sum and carry signals in response to first, second and third input signals, each having Up and Down conditions, comprising: first means for producing the inversion of said first input signal; second means responsive to said first means and said second signal for producing an electrical indication which is Up only when said first and second input signals are substantially identical; third means for producing the inversion of said third input signal; a sum terminal; a carry terminal; fourth means connected to said sum terminal and responsive to the Up condition of said indication and to the Down condition of the inversion of said third input signal to produce a sum signal; fifth means connected to said sum terminal and responsive to the Up condition of the inversion of said third input signal and to the Down condition of said indication to produce a sum signal; sixth means responsive to said second means and connected to said carry terminal for causing the latter to be Up when said second input signal is Up and the inversion of said first input signal is Down; and means connected to said carry terminal and responsive to the Up condition of said third input and the Down condition of said indication for producing a carry signal at said carry terminal.

5. An adding circuit responsive to first, second and third input signals to produce sum and carry output signals, each said signal having Up and Down conditions, comprising: a plurality of electrical switching means having On nad Off states; a first switching means having said first and second inputs thereof respectively coupled to said first and second input signals, whereby said means is On only when said first and second input signals are both Down; a second switching means having the first and second inputs thereof respectively coupled to said second and first input signals, whereby said second means is On only when both said first and second input signals are Up; a third switching means having the first input thereof coupled to said first and second switching means and the second input thereof coupled to said third input signal whereby a sum output signal is produced when said third input signal is Up and one of said first and second switching means is On; fourth switching means having the first input thereof coupled to said third input signal and the second input thereof coupled to said first and second switching means for producing a sum signal when both said switching means are Off and said third input signal is Down; fifth switching means having the first and second inputs respectively coupled to said third input signal and said first and second switching means for producing a carry signal when both said switching means are Off and said third input signal is Up; and means responsive to said second switching means for producing a carry signal when said first and second input signals are both Up.

6. An adding device for producing sum and carry signals in response to first, second and third input signals having Up and Down conditions comprising, a first transistor having the emitter thereof coupled to said first signal and the base thereof coupled to said second input for producing a first Up signal when said first and second inputs are both Down, second transistor means having the emitter thereof coupled to said second input and the base thereof coupled to said first input for producing a second Up signal when said first and second inputs are both Up, third transistor means responsive to said first and second Up signals and said third input signal for producing a sum signal when said third input signal is Up and said first and second input signals are simultaneously Up or Down, fourth transistor means coupled to said first and second transistor means and responsive to said third input signal for producing a sum signal when said third input signal is Down and only one of said first and second input signals is Up, means responsive to said second Up signal for producing a carry signal, and fifth transistor means having the emitter thereof coupled to said third input signal and the base thereof coupled to the common output of said first and second transistor means for producing a carry signal when said third input and one of said first and second inputs are Up simultaneously.

7. An adding circuit responsive to first, second and third input signals for producing sum and carry output signals each shiftable between Up and Down comprising: a plurality of transistors each having emitter, base and collector electrodes; means biasing each transistor whereby the collector thereof is normally Down; a first transistor having the emitter thereof connected to said first input signal and the base thereof coupled to said second input signal whereby the collector thereof is Up when said first and second input signals are both Down; second and third transistors each having the base thereof coupled to said first input and the emitters thereof to said second input whereby the collectors of said transistors are Up when said first and second inputs are both Up; a fourth transistor having the emitter thereof coupled to the collectors of said first and second transistors and having the base thereof coupled to said third input for producing a sum output signal when the emitter thereof is Up and the base thereof is Down; a fifth transistor having the emitter thereof coupled to said third input and the base thereof coupled to the collectors of said first and second transistors for producing a sum output signal when said collectors are Down and said third input is Down; a sixth transistor having the emitter thereof coupled to said third input and the base thereof coupled to the collectors of said first and second transistors whereby the collector of said sixth transistor is Up to produce a carry output signal when said third input is Up and the collectors of said first and second transistor are Down; and means coupling the collector of said third transistor to the collector of said sixth transistor for producing a carry output signal when said first and second input signals are both Up.

8. An adding circuit responsive to first, second and third input signals and producing sum and carry output signals, each shiftable between Up and Down states, comprising: a plurality of transistors switchable between Off and On states each having emitter, base and collector electrodes; means biasing each transistor Off by normally maintaining the base positive with respect to the emitter thereof; a first transistor having the emitter thereof coupled to said first input signal and the base coupled to the said second input signal whereby said transistor is switched to the On state only when said first and second terminals are Down; a second transistor having the emitter and base thereof respectively coupled to said second and first input signals whereby said transistor is On only when said first and second input signals are both Up; a third transistor having the emitter coupled to the collectors of said first and second transistors and the base coupled to said third input for producing an Up sum signal when one of said collectors and said third input are both Up; a fourth transistor having the emitter thereof coupled to said third input signal and the base thereof coupled to the collectors of said first and second transistors for producing an Up sum signal when said third input is Down and both of said collectors are Down; a carry output terminal; means coupling the collector of said second transistor to said carry output terminal for producing an Up carry signal when both of said first and second input signals are Up; and a fifth transistor having the emitter thereof coupled to said third input signal and the base thereof coupled to the collectors of said first and second transistors and the collector thereof coupled to said carry output terminal for producing an Up carry signal when said third input signal is Up and said collectors are Down.

References Cited in the file of this patent

UNITED STATES PATENTS

| | | |
|---|---|---|
| 2,629,834 | Trent | Feb. 24, 1953 |
| 2,670,445 | Felher | Feb. 23, 1954 |
| 2,758,787 | Felher | Aug. 14, 1956 |
| 2,781,968 | Chenus | Feb. 19, 1957 |
| 2,803,401 | Nelson | Aug. 20, 1957 |

FOREIGN PATENTS

| | | |
|---|---|---|
| 741,418 | Great Britain | Dec. 7, 1955 |

OTHER REFERENCES

Williams et al.: Universal High-Speed Digital Computers: Serial Computing Circuits, Proceedings of the Institution of Electrical Engineers (April 1952), pp. 111–112 relied on.

Williams et al.: A method of Designing Transistor Trigger Circuits, Proceedings of the Institution of Electrical Engineers, vol. 100, part III (1953), pp. 228–248.

Washburn: An Application of Boolean Algebra to the Design of Electronic Switching Circuits, Communications and Electronics, September 1953, pp. 380–388.